(12) United States Patent
Nelson

(10) Patent No.: US 6,256,811 B1
(45) Date of Patent: Jul. 10, 2001

(54) FIBER OPTIC STARLIGHT FURNITURE

(76) Inventor: Eric S. Nelson, 7623 Storrie Pl. NE., Albuquerque, NM (US) 87109

(*) Notice: Subject to any disclaimer, the term of this patent is extended or adjusted under 35 U.S.C. 154(b) by 0 days.

(21) Appl. No.: 09/244,427

(22) Filed: Feb. 10, 1999

Related U.S. Application Data

(60) Provisional application No. 60/074,215, filed on Feb. 10, 1998.

(51) Int. Cl.[7] ............ F21V 8/00; G09F 13/00
(52) U.S. Cl. ............ 5/53.1; 5/905; 40/547; 362/130; 362/565; 362/801; 362/806
(58) Field of Search ............ 5/53.1, 905; 362/127, 362/130, 551, 565, 576, 801, 806, 807; 40/547

(56) References Cited

U.S. PATENT DOCUMENTS

| | | | | |
|---|---|---|---|---|
| 2,821,621 | * | 1/1958 | Allunario | 362/124 X |
| 3,184,872 | * | 5/1965 | Way | 40/547 X |
| 3,470,629 | * | 10/1969 | Kittredge et al. | 434/286 |
| 3,789,521 | * | 2/1974 | Way et al. | 40/547 X |
| 3,904,866 | * | 9/1975 | Hayes | 362/31 |
| 4,519,017 | * | 5/1985 | Daniel | 362/565 |
| 4,754,372 | * | 6/1988 | Harrison | 362/576 X |
| 4,830,899 | * | 5/1989 | Nakahashi et al. | 40/547 X |
| 4,843,524 | * | 6/1989 | Krent et al. | 362/127 |
| 4,860,475 | * | 8/1989 | Levy et al. | 40/547 |
| 4,922,384 | * | 5/1990 | Torrence | 362/31 |
| 5,040,320 | * | 8/1991 | Reidinger | 40/547 X |
| 5,572,818 | * | 11/1996 | Churchill | 210/547 |
| 5,575,098 | * | 11/1996 | Goettel-Schwartz | 362/800 X |
| 5,823,652 | * | 10/1998 | Varr | 40/547 X |
| 5,879,071 | * | 3/1999 | Sanford, Jr. | 362/122 X |
| 5,944,416 | * | 8/1999 | Marsh | 362/565 X |
| 6,024,476 | * | 2/2000 | Wakeman | 40/547 X |
| 6,082,886 | * | 7/2000 | Stanford | 362/576 |
| 6,092,318 | * | 7/2000 | Arie et al. | 40/547 |
| 6,105,289 | * | 8/2000 | Grandis | 40/547 X |

\* cited by examiner

*Primary Examiner*—Anthony Knight
*Assistant Examiner*—Robert G. Santos
(74) *Attorney, Agent, or Firm*—Nancy Ownbey; Deborah A. Peacock

(57) ABSTRACT

A fiber optic illuminated starlight scene on a headboard. By using a plurality of optical fibers (22) lighted by an illuminator (20) and the optical fiber/visible end (16) are positioned flush with front panel (12) decorative scene (14) a realistic rendition of a starlight scene is created. The optical fibers/visible ends (16) placement and dispersion in the decorative scene (14) along with the distance and angle of the optical fibers (22) to the illuminator makes each individual optical fiber/visible end (16) appear as starlight.

7 Claims, 2 Drawing Sheets

FIBER OPTIC STARLIGHT FURNITURE

CROSS REFERENCES TO RELATED APPLICATIONS

This application is entitled to the benefit of provisional patent application Ser. No. 60/074,215, filed Feb. 10, 1998

BACKGROUND

1. Field of Invention

This invention relates to fiber optic illumination, specifically to end emitting optical fibers whose placement and size depict starlight in furniture.

2. Description of Prior Art

The use of fiber optic illumination has become widespread and taken many forms. End emitting optical fibers are used in decorative lamps and signs. These designs can be interesting and functional. The design possibilities are unlimited.

The U.S. Pat. No. 4,807,495 to Bell (1989) shows the use of optical fibers in a flat surface, such as tables or counters. Light is transmitted through the fibers to a transparent or translucent surface. The resulting light can then be used for illumination or for informational signage by use of templates as shown. Bell's patent incorporates features that are common to most fiber optic applications. A single illumination source for ease of maintenance is widely used. Heat and electricity are distanced from the point of display. Manipulation of light at the input end of the optical fibers by color or wavelength is one of the main attributes of these light systems.

The use of a perforated panel with a light source is shown by Polk U.S. Pat. No. 5,613,757 (1997). This is not a realistic depiction of starlight. The fact that stars are light emitting bodies dictates that a realistic rendition of such should be a light emitting device. Stars are of different brightness and for realism should be depicted as such. It does not appear that the canopy of Polk has a means to vary the brightness of the star perforations.

OBJECTS AND ADVANTAGES

Accordingly, several objects and advantages of my invention are:

(a) to provide a realistic depiction of starlight by using end emitting optical fibers;

(b) to produce a scene in which the starlight is in a proper scale;

(c) to create a visual environment conducive to sleeping;

(d) to provide orientation to a viewer in a darkened environment;

(e) to produce a scene generally viewed in a vertical position;

(f) to produce a scene in a horizontal position viewed from below;

(g) to produce a scene with a multitude of starlights;

(h) to produce an accurate rendition of star positions or a universe of the designer's creation.

Further objects and advantages are those features common to fiber optic lighting systems. The ability to remove the heat source from the viewing area, the option to manipulate the light as to color and brightness, and the use of a single illuminator for a plurality of optical fibers are some of the common benefits.

In the recorded history of human existence, star viewing has been a universal activity. The visual sense of that viewing is accurately rendered in this invention. Still further objects and advantages will become apparent from a consideration of the ensuing description and accompanying drawings.

Figure 1:
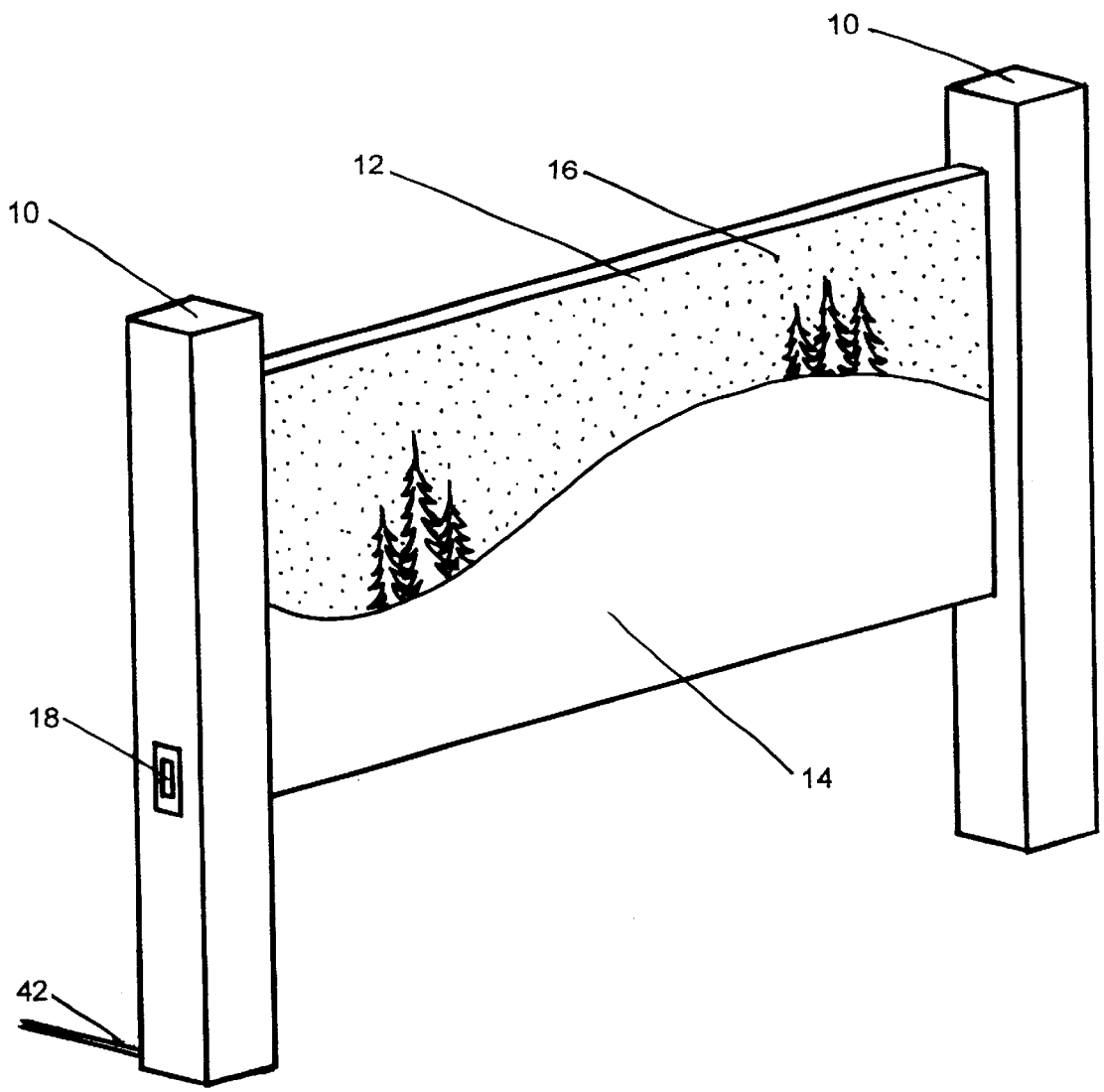
FIG. 1 is a front view of a headboard.

REFERENCE NUMERALS 10 support post
12 front panel
14 decorative scene
16 optical fibers/visible ends
18 switch
20 illuminator
22 optical fibers
24 top cover
26 bottom cover
28 spacer blocks
30 rear cover panel
32 switch housing
34 post cover
36 opening
38 guide/support hole
40 adhesive
42 cord

SUMMARY

The fiber optic starlight furniture of this invention can be generally applied to the vertical surface of an article of furniture. A structural surface on which a starlight scene is applied is illuminated by a multiplicity of optical fibers. Light from an enclosed illuminator is carried by the optical fibers through an enclosure to the face of the structural surface. The illuminated visible ends of the optical fibers produce the starlight of the scene.

PREFERRED EMBODIMENTS

DESCRIPTION

A preferred embodiment of the fiber optic starlight furniture of the present invention is illustrated in a front view of a headboard of FIG. 1. The headboard consists of two support posts 10 attached to a front panel 12. The front panel 12 is of sufficient structural strength to support all attachments to it. On the front panel 12 is a decorative scene 14. The decorative scene 14 can be created in numerous ways. Examples are: painted, carved, etched, burned, stained, embossed and overlaid. Any other method of creating a decorative scene 14 would achieve the desired result in the present invention. The optical fibers/visible ends 16 represent stars in the celestial portion of the decorative scene 14. A plurality of optical fibers/visible ends 16, randomly spaced or conforming to star charts, creates the image of a starlit sky. A switch 18 controls light output from an illuminator 20. A cord 42 supplies power to illuminator 20.

Figure 2:
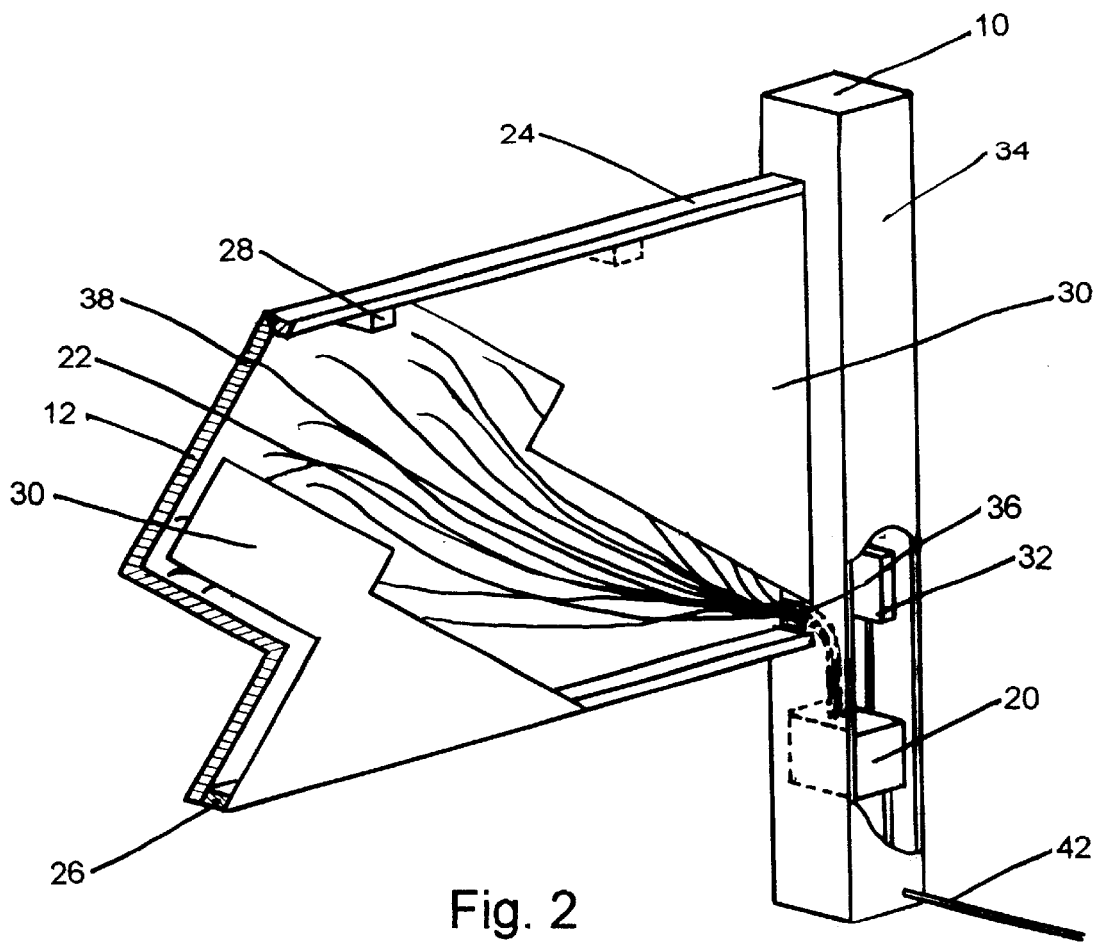
FIG. 2 is a rear view of a headboard.

The rear view of a headboard is illustrated in FIG. 2. An enclosure for optical fibers 22 is created by attaching a top cover 24 and a bottom cover 26 to front panel 12. Attached to bottom cover 26 and to spacer blocks 28 is a rear cover panel 30. An enclosure for an illuminator 20 and a switch housing 32 is formed by attaching a post cover 34 to support post 10. An opening 36 through support post 10 into the enclosure for the optical fibers 22 is created to provide a raceway to illuminator 20.

Figure 3:
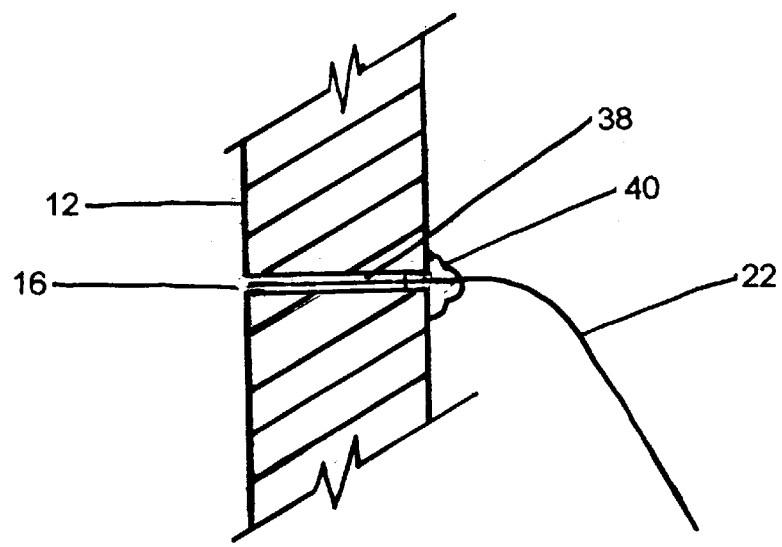
FIG. 3 is a view of a guide/support hole.

FIG. 3 is a view of a guide/support hole 38. The guide/support hole 38 connects the enclosure for the optical fibers 22 to the face of front panel 12 to position the optical fibers/visible ends 16 as a star in the sky portion of the decorative scene 14. The optical fibers 22 are positioned where the optical fibers/visible ends 16 are even with the face of front panel 12 and secured in place by an adhesive 40. Various diameters of optical fibers 22 enhance the realism of the starlit portion of the decorative scene 14. For example, to create a realistic starlit sky on a headboard, optical fibers 22 with a core diameter of 200, 300 or 400 microns are effective in combination to depict different star size and perspective for the viewer. Also by positioning the input ends of the optical fibers 22 at the illuminator 20 the amount of light entering the optical fibers 22 can be manipulated. This can create the effect of depth in the star scene by having the top portion of the optical fibers/visible ends 16 stars brighter and the lower portion less bright. This effect creates the illusion of depth in the starlit sky.

PREFERRED EMBODIMENT

OPERATION

Operation of the fiber optic starlight furniture invention is by completing an electrical circuit by switching on or off a switch 18.

OTHER EMBODIMENTS

Embodiment Name
Description

Embodiment Name
Operation

CONCLUSIONS, RAMIFICATIONS, AND SCOPE

Accordingly, it can be seen that the fiber optic starlight furniture of the invention provides a realistic rendering of a star filled night sky. The optical fibers/visible ends 16 of different sizes and a variable quantity can create the star filled night sky image. An infinite number of subjects can be designed for the decorative scene 14. The light transmitted through the optical fibers 22 can be manipulated to create colored stars, color changing stars or pulsating light stars by variations in the illuminator 20. The compartments for enclosing the optical fibers 22 and the illuminator 20 are to prevent light from escaping and detracting from the starlight scene.

Although the description above contains many specificities, these should not be construed as limiting the scope of the invention but as merely providing illustrations of some of the presently preferred embodiments of this invention. Various other embodiments and ramifications are possible within it's scope. For example, the design of the starlight scene and the component parts to illuminate it is adaptable to many furniture and non-furniture uses. It is easily seen that this design would work in an entertainment center, a mirror frame, a mantle, decorative bookshelves, wall hangings and pedestrian doors both interior and exterior. The diameter size of the optical fibers 22 should be based on the scale of the decorative scene 14. The power source for the illuminator 20 could be from any electrical producing or storage source.

Thus the scope of the invention should be determined by the appended claims and their legal equivalents, rather than by the examples given.

What is claimed is:

1. An article of furniture comprising:

a generally vertical rigid structural surface of the article of furniture comprising a fiber optic illuminated starlight scene;

an illuminator to produce light;

a multiplicity of optical fibers having directly visible ends and power supply ends, said directly visible ends of said optical fibers penetrating said rigid structural surface in a celestial portion of said starlight scene and carrying light from said illuminator to said visible ends of said optical fibers;

an enclosure proximate to said structural surface for containing and hiding from view said optical fibers;

an enclosure proximate to said structural surface for said illuminator;

wherein at least one of said enclosures comprises at least one support post attached to said rigid structural surface.

2. The article of furniture of claim 1 wherein the light produced by said illuminator comprises a randomly pulsating wavelength light to imitate twinkling stars.

3. The article of furniture of claim 1 wherein said optical fibers comprise disparate diameters to produce said starlight scene.

4. The article of furniture of claim 1 wherein said structural surface comprises at least one composition selected from the group consisting of paintings, carvings, etchings, burnings, stainings, embossings, and overlayings.

5. The article of furniture of claim 1 wherein said generally vertical rigid structural surface comprises at least one surface selected from the group consisting of a headboard, footboard, entertainment center, mirror frame, mantle, bookshelf, interior door and exterior door.

6. The article of furniture of claim 1 wherein said surface comprises a plurality of support holes for supporting the visible ends of said optical fibers.

7. The article of furniture of claim 1 wherein said illuminator produces colored light.

\* \* \* \* \*